(12) United States Patent
Mirza et al.

(10) Patent No.: US 11,540,353 B2
(45) Date of Patent: Dec. 27, 2022

(54) SMALL CELL RADIO AND ANTENNA MODULE

(71) Applicant: CommScope Design & Integration UK Limited, Fife (GB)

(72) Inventors: Ali Mirza, Guildford (GB); Dipen Rai, Guildford (GB); Steven Lock, Guildford (GB)

(73) Assignee: CommScope Design & Integration UK Limited, Fife (GB)

( * ) Notice: Subject to any disclaimer, the term of this patent is extended or adjusted under 35 U.S.C. 154(b) by 0 days.

(21) Appl. No.: 17/197,706

(22) Filed: Mar. 10, 2021

(65) Prior Publication Data

US 2021/0321486 A1    Oct. 14, 2021

Related U.S. Application Data

(60) Provisional application No. 63/069,781, filed on Aug. 25, 2020, provisional application No. 63/008,408, filed on Apr. 10, 2020.

(51) Int. Cl.
*H04W 88/08* (2009.01)
(52) U.S. Cl.
CPC .................................. *H04W 88/08* (2013.01)
(58) Field of Classification Search
CPC .......... H01Q 1/246; H01Q 1/42; H01Q 21/28; H01Q 1/1228; H01Q 21/24; H01Q 1/1242;
(Continued)

(56) References Cited

U.S. PATENT DOCUMENTS 10,886,595 B1 *   1/2021   Ortel ...................... H01Q 1/246
2017/0214113 A1   7/2017   Norrell et al.
(Continued)

FOREIGN PATENT DOCUMENTS

CN    204424421 U    6/2015
CN    204596939 U    8/2015
(Continued)

OTHER PUBLICATIONS

PCT Notification of Transmittal of the International Search Report and the Written Opinion of the International Searching Authority, or the Declaration, dated Jun. 21, 2021, for corresponding PCT International Application No. PCT/US2021/020486.
(Continued)

*Primary Examiner* — Golam Sorowar
(74) *Attorney, Agent, or Firm* — Myers Bigel, P.A.

(57) ABSTRACT

An antenna module includes: an antenna-radio unit comprising an antenna and a radio transceiver in an integrated unit; a foundation plate configured for mounting to a monopole; a bottom plate mounted above the foundation plate to form a first air gap; a support member that extends upwardly from the bottom plate, the antenna-radio unit mounted to the support member; an upper plate mounted to an upper end of the support member; a fan unit mounted to the upper plate; a lower cap mounted above the upper plate; an upper cap mounted above the lower cap to form a second air gap; and a shroud that surrounds and conceals the antenna-radio unit and the support member.

20 Claims, 9 Drawing Sheets

(58) Field of Classification Search
CPC ...... H01Q 21/065; H01Q 1/02; H01Q 21/205; H01Q 1/44; H01Q 25/005; H01Q 25/00; H01Q 21/29; H01Q 1/50; H01Q 1/48; H01Q 21/0025; H01Q 1/2291; H01Q 21/08; H01Q 1/1207; H01Q 3/46; H01Q 21/00; H01Q 21/064; H01Q 23/00; H01Q 1/04; H01Q 3/26; H01Q 21/062; H01Q 25/001; H01Q 1/38; H01Q 3/40; H01Q 1/125; H01Q 21/0087; H01Q 21/26; H01Q 1/007; H01Q 3/04; H01Q 1/36; H01Q 3/20; H01Q 1/12; H01Q 1/523; H01Q 19/09; H01Q 3/08; H04W 88/08; H04W 16/28; H04W 24/02; H04W 84/18; H04W 4/40; H04W 72/0453; H04W 88/10; H04W 4/38; H04W 4/70; H04W 4/027; H04W 84/12; H04W 88/085; H04W 72/046; H04W 88/04; H04W 76/10; H04W 84/02; H04W 24/04; H04W 76/15; H04W 84/045; H04W 24/10; H04W 40/20; H04W 88/14; H04W 92/02; H04W 92/20; H04W 24/08; H04W 72/082; H04W 16/26; H04W 28/0236; H04W 28/0268; H04B 7/10; H04B 7/0617; H04B 7/0408; H04B 7/0413; H04B 1/40; H04B 7/0695; H04B 7/04; H04B 7/088; H04B 17/318; H04B 17/309; H04B 7/05; H04B 1/401; H04B 1/50; H04B 10/25; H04B 3/56; H04B 3/54; H04B 3/58; H04B 7/15592; H04B 7/024; H04B 2203/5441; H04B 7/1555; H04B 3/542; H04B 7/0452; H04B 7/15507; H04B 7/14; H04B 3/52; H04B 7/0456; H04B 7/0874; H04B 2203/5404; H04B 2203/5479

See application file for complete search history.

(56) References Cited

U.S. PATENT DOCUMENTS

| | | | |
|---|---|---|---|
| 2018/0254545 | A1 | 9/2018 | Hendrix et al. |
| 2018/0277921 | A1* | 9/2018 | Ming .................... H01Q 1/246 |
| 2019/0267700 | A1 | 8/2019 | Hendrix et al. |
| 2019/0273313 | A1* | 9/2019 | Schwartz ................ H01Q 1/12 |
| 2020/0136236 | A1 | 4/2020 | Colapietro et al. |
| 2020/0388907 | A1 | 12/2020 | Colapietro |
| 2021/0313665 | A1* | 10/2021 | Hoganson ............... H01Q 1/42 |

FOREIGN PATENT DOCUMENTS

| | | |
|---|---|---|
| CN | 208753503 U | 4/2019 |
| CN | 110492216 A | 11/2019 |
| CN | 110792312 A | 2/2020 |
| WO | 2018114510 A1 | 6/2018 |

OTHER PUBLICATIONS

"ESB Sistemas, "Camouflage Hybrid Antenna 2/3/4/5G New Product Release," ESB Sistemas Espana S.L., May 2020, Available online at: www.esbsistemas.com".

"International Search Report and Written Opinion corresponding to International PCT Application No. PCT/EP2021/059027 dated Jul. 1, 2021".

* cited by examiner

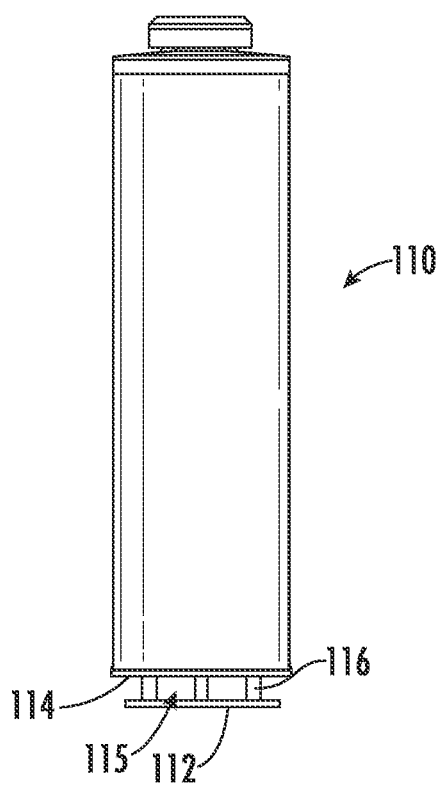
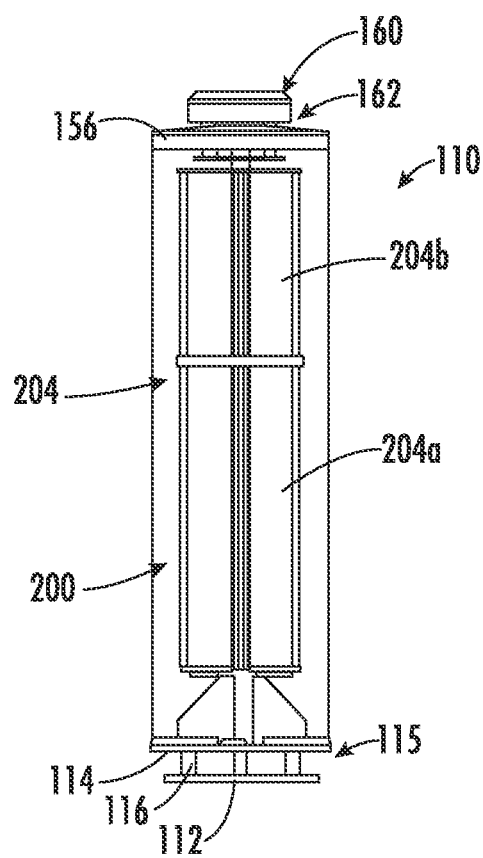
FIG. 2
FIG. 3

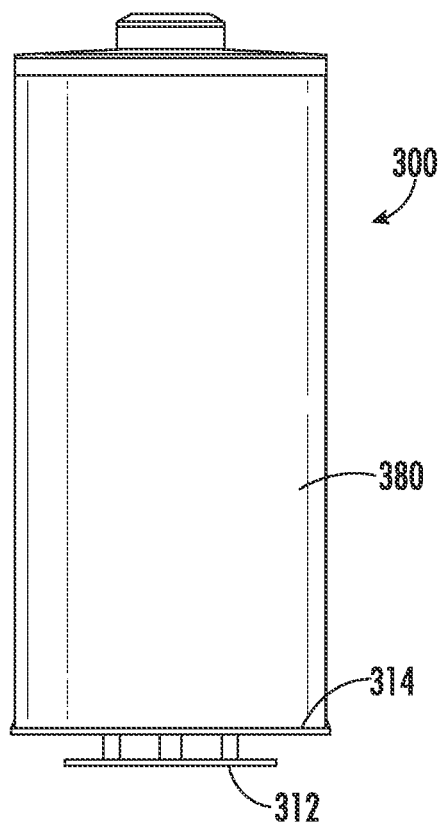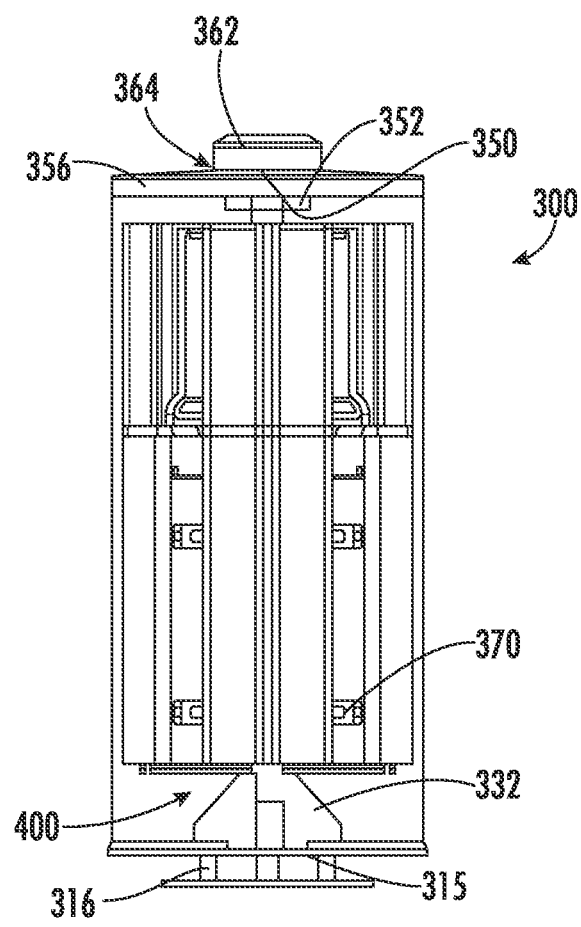
FIG. 10
FIG. 11

SMALL CELL RADIO AND ANTENNA MODULE

RELATED APPLICATIONS

The present application claims priority from and the benefit of U.S. Provisional Patent Application Nos. 63/008,408, filed Apr. 10, 2020, and 63/069,781, filed Aug. 25, 2020, each of which is hereby incorporated herein by reference in full.

FIELD

The present invention is directed generally toward communication antennas, and more particularly to mounting structures for communications antennas.

BACKGROUND

As wireless data service demands have grown, a conventional response has been to increase the number and capacity of conventional cellular Base Stations (Macro-Cells). The antennas used by such Macro-Cells are typically mounted on antenna towers. A conventional antenna tower has three or four legs on which antennas and supporting remote radio units (RRUs) are mounted. However, in some environments structures known as "monopoles" are used as mounting structures. Monopoles are typically employed when fewer antennas/RRUs are to be mounted, and/or when a structure of less height is required.

In addition, Macro-Cell sites are becoming less available, and available spectrum limits how much additional capacity can be derived from a given Macro-Cell. Accordingly, small cell RRU and antenna combinations have been developed to "fill in" underserved or congested areas that would otherwise be within a Macro-Cell site. Deployment of small cells, particularly in urban environments, is expected to continue to grow. Often such small cell configurations (sometimes termed "metrocells") are mounted on monopoles.

In view of the foregoing, it may be desirable to provide additional monopole arrangements for either Macro-cell or metrocell sites.

SUMMARY

A first aspect of the present invention is directed to an antenna module. The antenna module includes an antenna-radio unit comprising an antenna and a radio transceiver in an integrated unit, a foundation plate configured for mounting to a monopole, a bottom plate mounted above the foundation plate to form a first air gap, a support member that extends upwardly from the bottom plate, the antenna-radio unit mounted to the support member, an upper plate mounted to an upper end of the support member, a fan unit mounted to the upper plate, a lower cap mounted above the upper plate, an upper cap mounted above the lower cap to form a second air gap, and a shroud that surrounds and conceals the antenna-radio unit and the support member.

Another aspect of the present invention is directed to a monopole assembly. The monopole assembly includes an elongate monopole and an antenna module. The antenna module includes an antenna-radio unit comprising an antenna and a first radio transceiver in an integrated unit, a foundation plate configured for mounting to the monopole, a bottom plate mounted above the foundation plate to form a first air gap, a support member that extends upwardly from the bottom plate, the antenna-radio unit mounted to the support member, an upper plate mounted to an upper end of the support member, a fan unit mounted to the upper plate, a lower cap mounted above the upper plate, an upper cap mounted above the lower cap to form a second air gap, and a shroud that surrounds and conceals the antenna-radio unit and the support member, and a second radio transceiver mounted outside of the module and connected to the antenna.

Another aspect of the present invention is direct to an antenna module. The antenna module includes three antenna-radio units each comprising an antenna and a radio transceiver in an integrated unit, a foundation plate configured for mounting to a monopole, a bottom plate mounted above the foundation plate to form a first air gap, a support member that extends upwardly from the bottom plate, the antenna-radio units mounted to the support member, an upper plate mounted to an upper end of the support member, a fan unit mounted to the upper plate, a lower cap mounted above the upper plate, an upper cap mounted above the lower cap to form a second air gap, and three shroud members that together surround and conceal the antenna-radio units and the support member, wherein, when together, the shroud members are hexagonal.

Another aspect of the present invention is directed to an antenna module. The antenna module includes three antenna-radio units each comprising an antenna and a radio transceiver in an integrated unit, a foundation plate configured for mounting to a monopole, a bottom plate mounted above the foundation plate to form a first air gap, a support member that extends upwardly from the bottom plate, the antenna-radio units mounted to the support member, an upper plate mounted to an upper end of the support member, a fan unit mounted to the upper plate, a lower cap mounted above the upper plate, an upper cap mounted above the lower cap to form a second air gap, and a hexagonal shroud member that surrounds and conceals the antenna-radio units and the support member, wherein the shroud member includes three cut-out portions, each cut-out portion corresponding to a respective antenna-radio unit and is configured such that at least a portion of the antenna-radio unit extends through the cut-out portion.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE FIGURES

FIG. 2 is a front view of an antenna module according to embodiments of the invention.

FIG. 3 is a front section view of the antenna module of FIG. 2.

FIG. 10 is a front view of an antenna module according to additional embodiments of the invention.

FIG. 11 is a front section view of the antenna module of FIG. 10.

DETAILED DESCRIPTION

Figure 1:
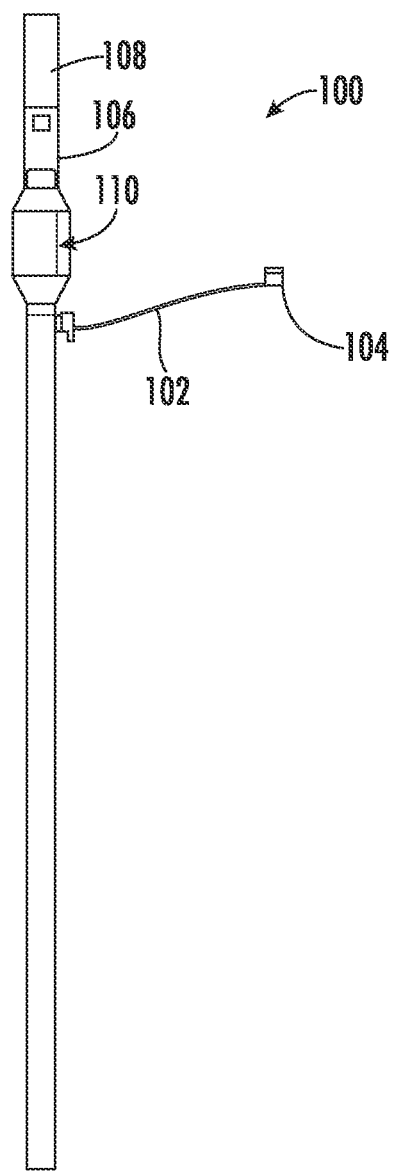
FIG. 1 is a front view of a typical monopole on which an antenna module according to embodiments of the invention may be mounted.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Referring now to the drawings, a telecommunications monopole designated at 100 is shown in FIG. 1. As can be seen in FIG. 1, the monopole 100, which is sized as a "metrocell" having a diameter of between about 8 to 20 inches and a height of between about 20 and 40 feet, is styled as a streetlight, with an arm 102 that mounts a luminaire 104 (such as an LED streetlight). The monopole 100 includes a radio module 106 and an antenna module 108. Monopoles of many varieties are known and are discussed in, for example, U.S. Patent Publication Nos. 2018/0254545; 2020/0136236; and 2020/0388907, the disclosures of each of which are incorporated herein by reference in full.

An antenna module for mounting on a monopole, designated broadly at 110, is shown in FIGS. 2-9. The antenna module 110 includes a foundation plate 112 and a bottom plate 114 that is separated from the foundation plate 112 by spacers 116 to form a gap 115. The foundation plate 112 includes discontinuous arcuate slots 118 in the form of a circle (FIG. 6) for mounting atop the monopole 100, and a central hole 120. The bottom plate 114 has an arcuate slot 122 positioned generally above the central hole 120 of the foundation plate 112. A fan controller 124 (e.g., a temperature sensor) is mounted to the bottom plate 114.

Figure 7:
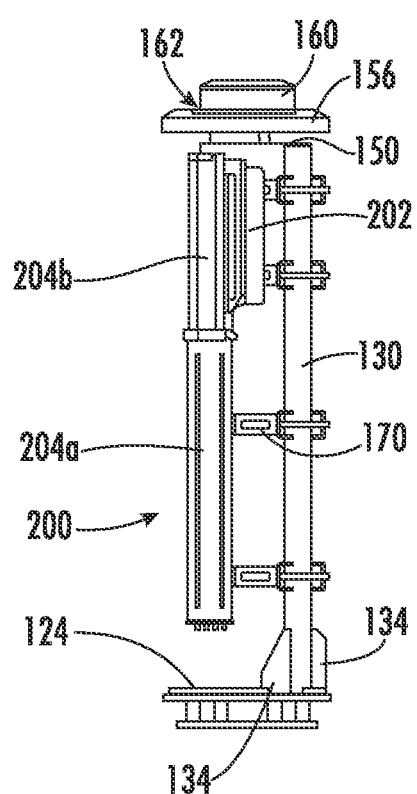
FIG. 7 is a side view of the antenna module of FIG. 2 with the shroud removed.
Figure 8:
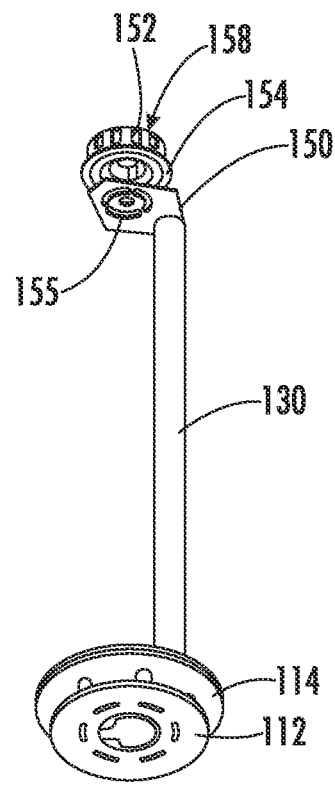
FIG. 8 is a bottom perspective view of the structural components of the antenna module of FIG. 2.
Figure 9:
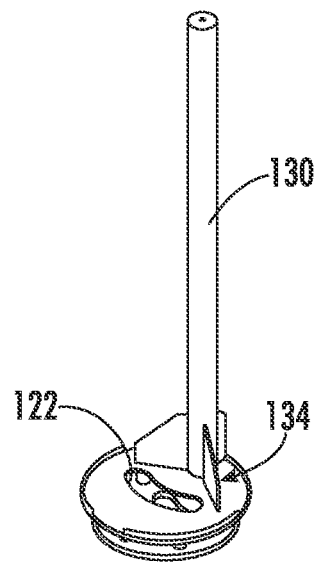
FIG. 9 is a top perspective view of the foundation plate, bottom plate and support pole of the antenna module of FIG. 2.
Figures 12, 13:
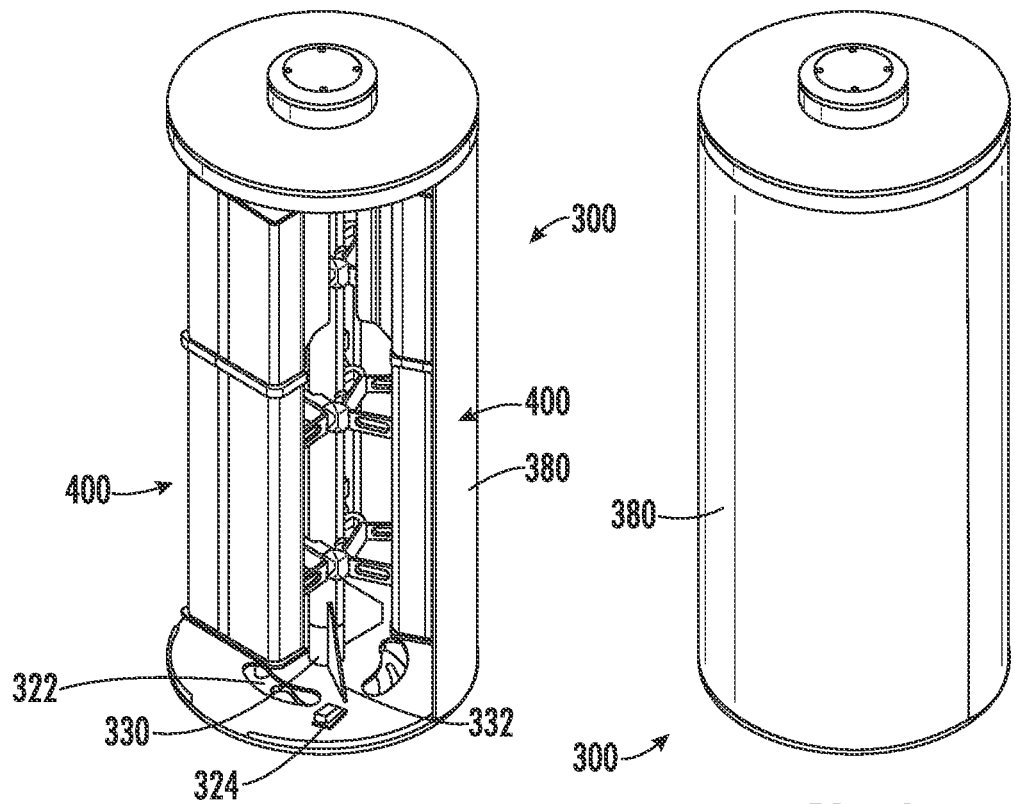
FIG. 12 is a front perspective cutaway view of the antenna module of FIG. 10.
FIG. 13 is a perspective view of the antenna module of FIG. 10.
Figure 14:
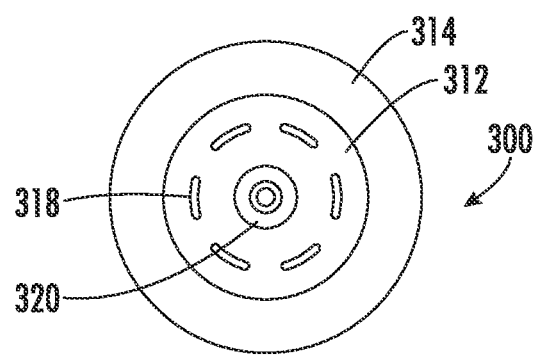
FIG. 14 is a bottom view of the antenna module of FIG. 10.

A support pole 130 or other support member is mounted to the upper surface of the bottom plate 114 and extends upwardly therefrom (see FIGS. 7-9). The support pole 130 is mounted off-center on the bottom plate 114, somewhat opposite the slot 122. The support pole 130 is supported by gussets 134. An upper plate 150 is mounted to the upper end of the support pole 130 and extends horizontally therefrom. The upper plate 150 includes arcuate openings 154 and a central opening 155.

A fan unit 152 is mounted to the upper plate 150. A lower cap 156 is positioned above the upper plate 150. A motor 158 that drives the fan unit 152 extends above the lower cap 156 and is covered with an upper cap 160. The upper cap 160 is mounted so that a gap 162 is present between the upper and lower caps 156, 160. The fan unit is electrically connected with the fan controller 124.

Figure 4:
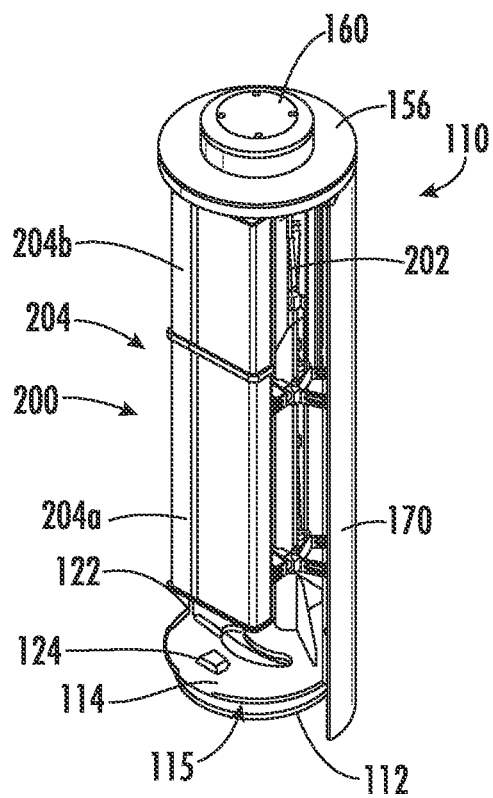
FIG. 4 is a front perspective cutaway view of the antenna module of FIG. 2.

As shown in FIGS. 3, 4 and 7, an antenna-radio unit 200 is mounted to the support pole 130 via mounting brackets 170. The antenna-radio unit 200 comprises both a transmit/receive radio 202 and an antenna 204 combined in the same unit (these are sometimes also known as "active" antennas). The illustrated antenna-radio unit 200 is a "5G" unit, which is a device that meets the requisite high level of performance and precision to satisfy 5G protocols and performance requirements. The antenna-radio unit 200 also includes connectors (not visible herein) to provide an interface for power and signal cables, which can be routed to the antenna radio unit 200 from the interior of the monopole 100 through the central hole 120 in the foundation plate 112 and through the arcuate slot 122 in the bottom plate 114.

Exemplary 5G antenna-radio units 200 include those offered by Nokia under the designation IPAA. IPAA is an interleaved Passive/Active antenna radio that combines a full passive antenna with an active radio. In other words, the antenna 204 of the unit 200 has a lower antenna area 204a and an upper antenna area 204b. The lower antenna area 204a is passive, and is connected with a radio (not shown) mounted elsewhere in the monopole 100 (for example, the unseen radio may be mounted below the module 110 and connected via cables that are routed through the central hole 120 and the arcuate slot 122. The upper antenna area 204b is served by the radio 202 that is mounted directly thereto (although in other embodiments the passive and active areas may be reversed). The IPAA is modular and field upgradeable, and offers 4G/5G a modernization solution with both 8T8R and 64T64R multi-input-multi-output ("MIMO") options. Those skilled in this art will appreciate that other antenna-radio units may also be employed, including both active and passive antennas.

Figure 5:
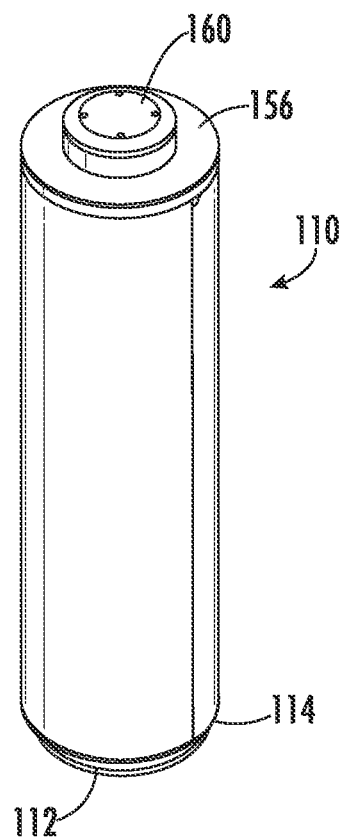
FIG. 5 is a perspective view of the antenna module of FIG. 2.
Figure 6:
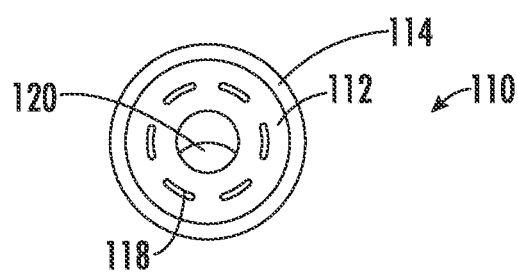
FIG. 6 is a bottom view of the antenna module of FIG. 2.

As shown in FIGS. 2 and 5, a shroud 180 surrounds the module 110 between the bottom plate 114 and the lower cap 156. However, and notably, the shroud 180 does not extend downwardly to cover the foundation plate 112 or upwardly beyond the lower cap 156. Thus, the gaps 115, 162 remain open to the environment. By shielding/concealing the internal equipment of the module 110 from view, the shroud 180 serves to provide a more appealing aesthetic appearance to the module 110. In some embodiments, the shroud 180 has a diameter that substantially matches that of the monopole 100. A typical diameter for the shroud 180 may be between about 6 and 14 inches.

Because of the presence of the gaps 115, 162, operation of the fan unit 152 draws air through the gap 115 and the arcuate slot 122 in the bottom plate 114. The air flows upwardly within the shroud 180, thereby cooling the antenna-radio unit 200 (which generates heat due to the operation of the radio 204). When the cooling air reaches the upper plate 150, the air flows through the holes 154 and the lower cap 156, and is exhausted through the gap 162. Operation of the fan unit 152 is controlled by the fan controller 124, which can both activate/deactivate the fan unit 152 and, when activated, control its speed, typically based on the temperature within the shroud 180.

The module 110 as described can enable easier zoning permits, especially on crowded sites, while offering an upgrade path to overlay 5G services. This concealment solution offers a combined Passive/Active antenna platform for greater capacity, seamless introduction of 5G services while supporting a wide band of legacy solutions and technologies. It features an overall structure that can be factory integrated and tested, ready to deploy on site with minimal or reduced need for skilled labor. The solution can enable mobile network operators (MNOs) to deploy 5G services at an economical scale, and can allow the swap and modernization of legacy and aged 4G-only solutions with easier zoning. With the module 110, MNOs can achieve their deployment targets using existing (and new sites), fewer sites, and be fast to market. The solution is field upgradable allowing the introduction of new active antenna elements in the future, thereby eliminating costly and time consuming antenna swaps.

Referring now to FIGS. 10-14, another module, designated broadly at 300, is shown therein. As can be seen from the figures, the module 300 includes three antenna-radio units 400, each of which has a radio 402 and an antenna 404 that divided into lower and upper areas 404a, 404b. Differences between the module 100 and the module 300 are described below.

A foundation plate 312 is separated from a bottom plate 314 by spacers 316 that form a gap 315. The foundation plate 312 includes a central hole 320 and a series of discontinuous arcuate slots 318 that form a circle around the central hole 320. These slots 318 are employed to mount the module 300 onto the top of a monopole 10. The bottom plate 314 has four arcuate slots 322 that provide both entry for air and routing for cables/cords, and a temperature controller 324 is also mounted on the bottom plate 314. A support pole 330 is mounted in the center of the bottom plate 314 and is supported by gussets 332. A top plate 350 is mounted to the top of the support pole 330. A fan unit 352 is mounted thereon, along with lower and upper caps 356, 362 similar to those described above having a gap 364 therebetween.

Each of the three antenna-radio units 400 is mounted to the support pole 330 via mounting brackets 370. Cables are routed through the arcuate slots 322 to connect with the antenna-radio units 400 in the manner described above. The three antenna-radio units 400 are mounted 120 degrees from each other, so that the module 300 can provide full 360 degree coverage for wireless transmission. A shroud 380 provides concealment for the antenna-radio units 400. A typical diameter for the shroud 180 may be between about 10 and 20 inches.

Those skilled in this art will appreciate that the module 300 can provide the advantages discussed above in connection with the module 100, but for a three-sector antenna module.

In addition, it should be noted that, although the modules 110, 300 are shown on a monopole 100, they may also be mounted on other structures, such as multi-leg antenna towers, rooftops (either on platforms or small poles), building walls, and the like.

Referring now to FIGS. 15A-15E, an alternative antenna module 300' according to embodiments of the present invention is illustrated. Properties and/or features of the antenna module assembly 300' may be described above in reference to the antenna modules 110, 300 shown in FIGS. 2-14 and duplicate discussion thereof may be omitted herein for the purposes of discussing FIGS. 15A-15E.

As shown in FIGS. 15A-15E, the antenna module 300' includes a foundation plate 312' and a bottom plate 314' that is separated from the foundation plate 312' by spacers 316' to form a gap 315'. The spacers 316' (and gap 315') are configured to lift the module 300' slightly above a top end of the monopole 100, which will help to allow air to flow into the antenna module 300'. The foundation plate 312' includes discontinuous arcuate slots 318' in the form of a circle (FIG. 15D) for mounting atop the monopole 100. The foundation plate 312' also includes discontinuous arcuate slots 317' sized such that cables may be routed from the monopole 100 into the antenna module 300'. Located generally above the foundation plate 312', the bottom plate 314' also has corresponding discontinuous arcuate slots 322' sized such that cables may be routed through into the antenna module 300' (see, e.g., FIG. 15E). For example, in some embodiments, cables may be routed from the monopole 100 through the slots 317' of the foundation plate 312', then through the arcuate slots 322' of the bottom plate 314' to antenna-radio unit(s) 400 within the antenna module 300'.

Figure 15A:
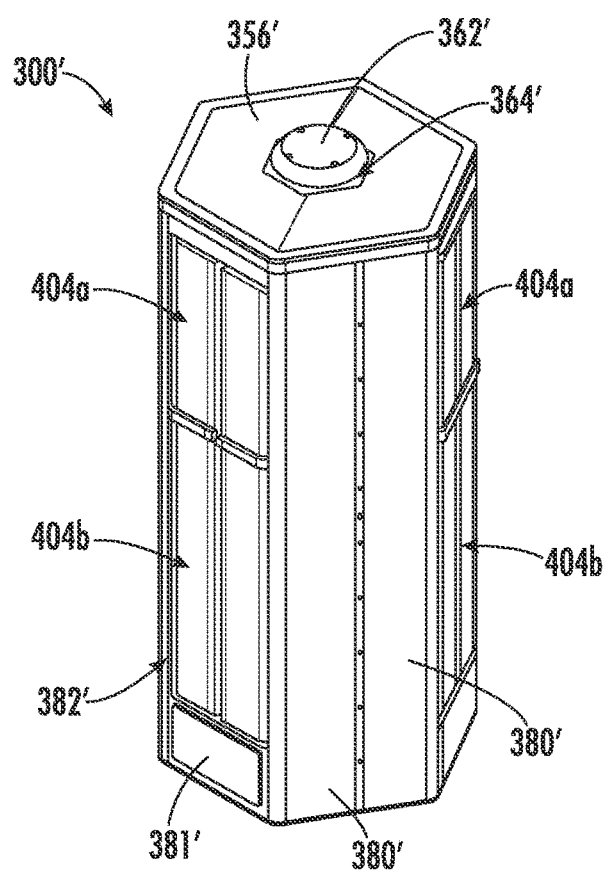
FIG. 15A is a perspective view of an alternative antenna module according to embodiments of the present invention.
Figure 15B:
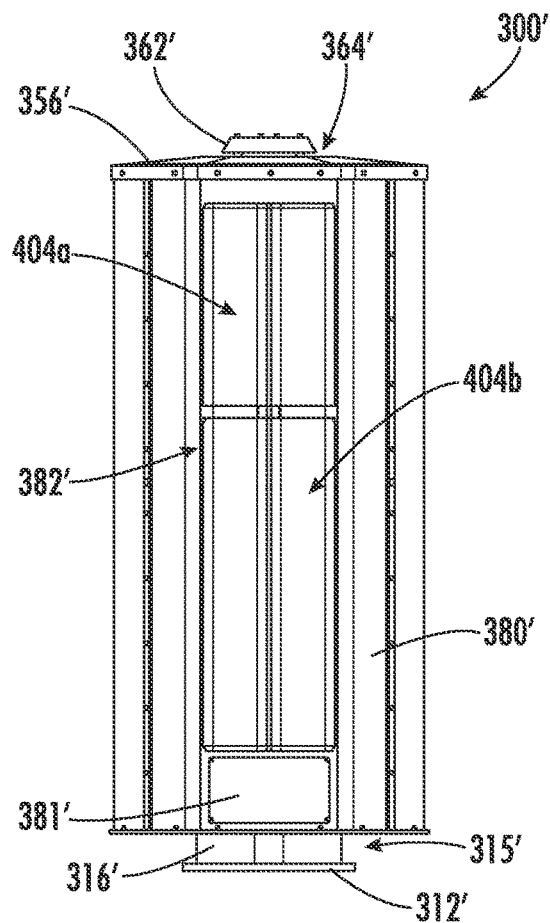
FIG. 15B is a side view of the antenna module of FIG. 15A.
Figure 15C:
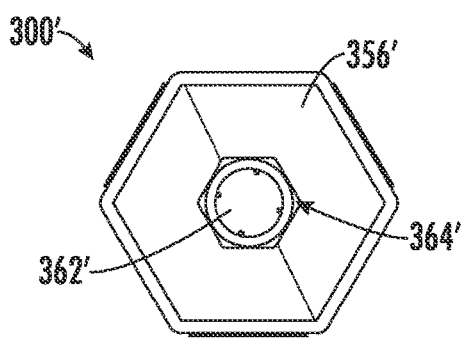
FIG. 15C is a top view of the antenna module of FIG. 15A.
Figure 15D:
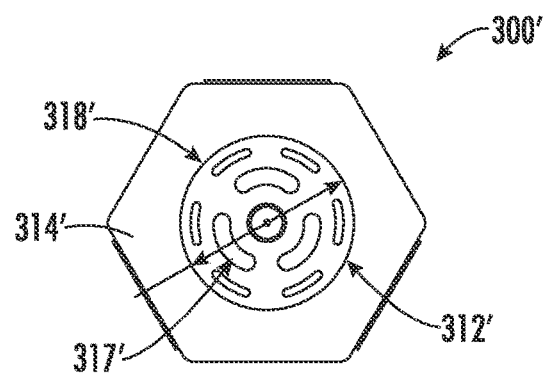
FIG. 15D is a bottom view of the antenna module of FIG. 15A.
Figure 15E:
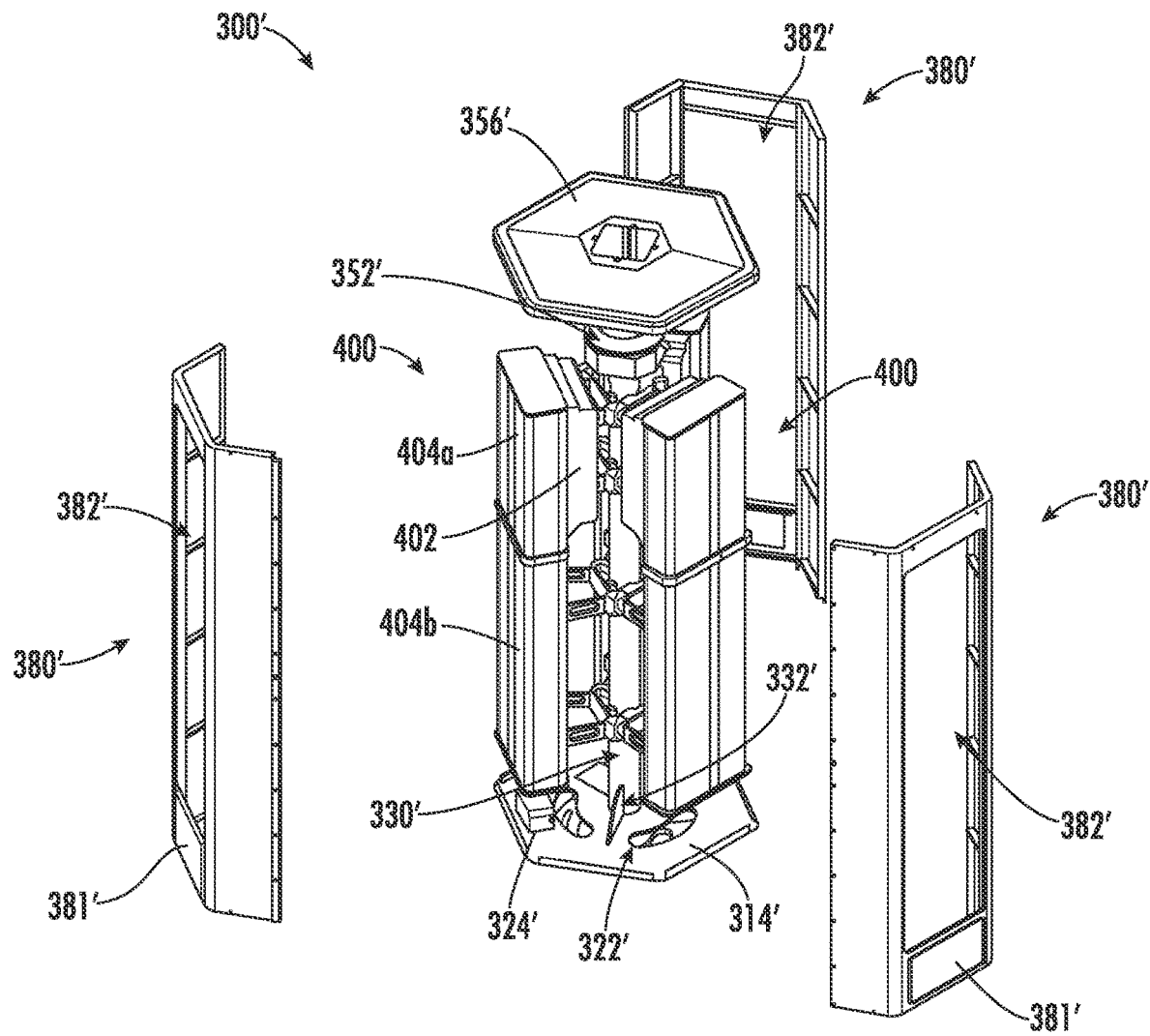
FIG. 15E is an exploded view of the antenna module of FIG. 15A.

As shown in FIGS. 15D-15E, in some embodiments, the bottom plate 314' may be hexagonal in shape.

In some embodiments, the antenna module 300' may be sized and configured to be used on rooftop deployments. For example, in some embodiments, the foundation plate 312' may be configured to be mounted on a smaller monopole 100 or rooftop platform. In some embodiments, the antenna module 300' may be sized and configured to be mounted on other types of deployments such as tower deployments (e.g., telecommunication lattice towers, electricity towers, concrete poles and/or concrete towers, etc.).

As shown in FIG. 15E, the antenna module 300' further includes a support pole 330' or other support member(s). In some embodiments, the support pole 330' is tubular (i.e., hollow) such that air may flow up through the pole 330'. In some embodiments, the support pole 330' is mounted to the upper surface of the bottom plate 314' and extends upwardly therefrom (see, e.g., FIG. 15E). The support pole 330' may be mounted generally in the center on the bottom plate 314', with the discontinuous arcuate slots 322' positioned circumferentially around the support pole 330'. The support pole 330' is open at both ends which will allow air to flow in through one end (e.g., through an opening in the bottom plate 314') and out the other end (e.g., through fan unit 352'). In some embodiments, the hollow support pole 330' may comprise a plurality of holes (not shown) that may allow air to flow from the support pole 330' into the antenna module 300'.

A fan controller 324' (e.g., a temperature sensor) is mounted to the bottom plate 314'. A fan unit 352' is mounted to the top of the support pole 330'. A lower cap 356' is positioned above the fan unit 352'. An upper cap 362' is mounted such that a gap 364' is present between the upper and lower caps 356', 362'. The fan unit 352' is electrically connected with the fan controller 324'. Similar to antenna module 300 described herein, the fan unit 352' is configured to draw air up through the support pole 330' and the arcuate slots 317', 322' to cool the interior of the antenna module 300'.

Because of the presence of the gaps 315', 364', operation of the fan unit 352' draws air through the gap 315' and the bottom plate 314' into the support pole 330'. The air flows upwardly through the support pole 330' and into the concealed interior of the antenna module 300' through arcuate slots 317', 322' exiting through holes in the support pole 330' (and the arcuate slots 317', 322') into the antenna module 300', thereby cooling the antenna-radio unit(s) 400 (which generates heat due to the operation of the radio(s) 402). When the cooling air reaches the lower cap 356', the air is exhausted through the gap 364'. Operation of the fan unit 352' is controlled by the fan controller 324', which can both activate/deactivate the fan unit 352' and, when activated, control its speed, typically based on the temperature within the antenna module 300'.

As shown in FIGS. 15A-15E, one or more antenna-radio units 400, as described herein, are mounted to the support pole 330' within the antenna module 300'. The antenna-radio units 400 may be mounted to the support pole 330' via one or more mounting brackets 500, described in further detail below (see, e.g., FIGS. 16A-16B). In some embodiments, the antenna module 300' comprises two or more antenna-radio units 400. For example, as shown in FIGS. 15A-15E, in some embodiments, the antenna module 300' may comprise three antenna-radio units 400. The antenna-radio units 400 have 120 degrees of separation. As discussed below, in some embodiments, the antenna module 300' may allow for the antenna-radio units 400 to be down-tilted (via mounting bracket 500).

In some embodiments, one or more shroud members (or radomes) 380' surround the antenna module 300' between the bottom plate 314' and the lower cap 356'. As shown in FIG. 15E, the antenna module 300' has three shroud members 380' (each shroud member 380' corresponding to an antenna-radio unit 400). However, and notably, the shroud members 380' do not extend downwardly to cover the foundation plate 312' or upwardly beyond the lower cap 356'. Thus, the gaps 315', 364' remain open to the environment. By shielding/concealing the internal equipment of the antenna module 300' from view, the shroud members 380' serve to provide a more appealing aesthetic appearance to the antenna module 300' (particularly when the wall of each shroud member 380' is substantially flush with the front surface of the antenna-radio unit 400). In some embodiments, the shroud members 380' are formed of a polymeric material, for example, acrylonitrile butadiene styrene (ABS).

In some embodiments, each shroud member 380' is configured such that, when placed on the antenna module 300', the exterior shape of the antenna module 300' is hexagonal. In some embodiments, each shroud member 380' may comprise a removable hatch 381' that allows access into the interior of the antenna module 300' (e.g., to allow a technician to connect cables to the antenna-radio units 400).

In some embodiments, each shroud member 380' comprises a cut-out portion 382' (or "window"). Each cut-out portion 382' is sized and configured such that at least a portion of the antenna-radio unit 400 may extend through the respective shroud member 380'. In some embodiments, a grommet or sealant may be used to seal and/or fill any gaps between the edges of the cut-out portion(s) 382' and the antenna-radio unit(s) 400, thereby preventing any moisture (e.g., rain) from entering the antenna module 300'. The cut-out portions 382' in the shroud members 380' may help to improve the overall RF performance of the antenna-radio units 400 by mitigating undesired impact on antenna gains and RF signal distortion, especially when dealing with a wideband spectrum.

Figure 16A:
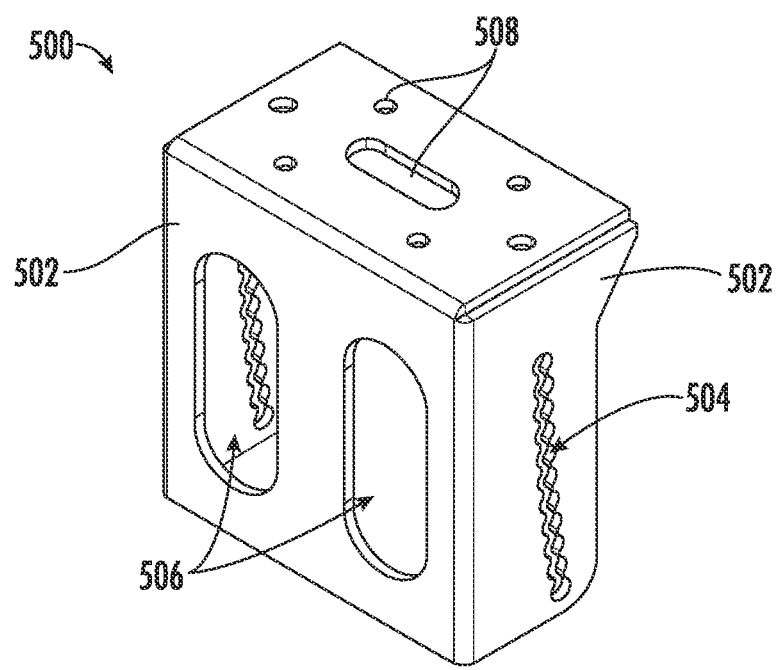
FIG. 16A is a perspective view of another exemplary mount that may be used with the antenna module of FIG. 15A.
Figure 16B:
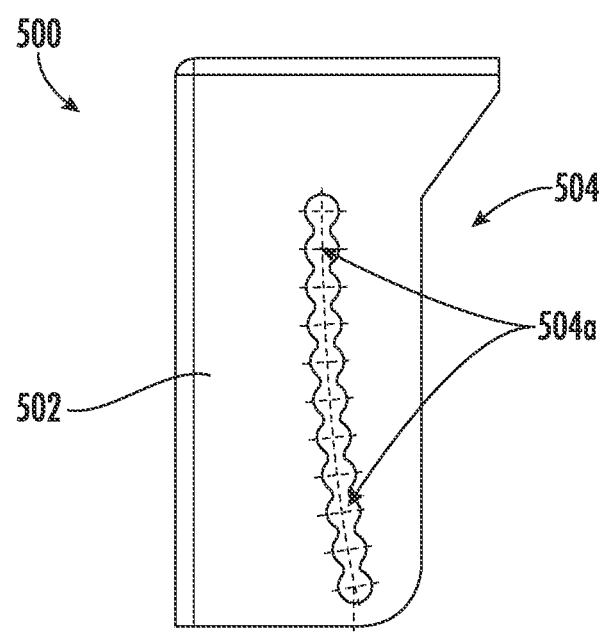
FIG. 16B is a side view of the mount of FIG. 16A.

In some embodiments, the cut-out portions 382' may also allow the introduction of a down-tilt feature for the antenna-radio units 400. For example, in some embodiments, the antenna-radio units 400 may be configured to be tilted between about 0 degrees to about 15 degrees, such that the upper portion of the antenna-radio 400 extends radially outwardly through the window 382'. An exemplary mount 500 that may allow for the down-tilt of the antenna-radio unit 400 is illustrated in FIGS. 16A-186B. The mount 500 is configured to secure the antenna-radio unit(s) 400 to the support pole 330'. As shown in FIGS. 16A-16B, opposing sides 502 of the mount 500 may have a tilt adjustment mechanism 504. In some embodiments, the tilt adjustment mechanism 6504 may comprise a series of holes (or notches) 504a that are configured such that the antenna-radio unit(s) 400 may be tilted in 1 degree increments. The sealant or grommet mentioned above may be configured such that the seal with the antenna-radio unit 400 remains even when the antenna-radio unit 400 is tilted.

The modularity of the antenna module 300' and relative light weight allows for ease of site delivery and installation. For example, the antenna module 300' may be provided as a flat-packed kit that can be hand carried to rooftops through staircases and most elevators, then assembled on site. Thus, eliminating the need for crane hires, associated traffic management and/or road closure permits (e.g., due to weight and size) to move the module 300 to the desired rooftop site locations. The modularity of the antenna module 300 may also provide for streamlining operation and maintenance by making it easier to replace a faulty module 300' or upgrade an existing module 300' on site with minimal costs. Finally, the antenna module 300' will support most antenna-radio units 400, thereby allowing greater flexibility for services providers.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna module, comprising:
   an antenna-radio unit comprising an antenna and a radio transceiver in an integrated unit;
   a foundation plate configured for mounting to a monopole;
   a bottom plate mounted above the foundation plate to form a first air gap;
   a support member that is coupled to and extends upwardly from the bottom plate, the antenna-radio unit mounted to the support member;
   an upper plate mounted to an upper end of the support member;
   a fan unit mounted to the upper plate;
   a lower cap mounted above the upper plate;
   an upper cap mounted above the lower cap to form a second air gap; and
   a shroud that surrounds and conceals the antenna-radio unit and the support member without extending beyond the bottom plate and the lower cap.

2. The antenna module defined in claim 1, wherein the antenna includes a first portion operatively connected with the radio transceiver, and a second portion configured to be connected with a second radio transceiver mounted outside of the antenna module.

3. The antenna module defined in claim 1, further comprising a fan controller operatively connected with the fan to control operation of the fan.

4. The antenna module defined in claim 3, wherein the fan controller controls the fan based on temperature.

5. The antenna module defined in claim 1, wherein the support pole is mounted off-center on the bottom plate.

6. The antenna module defined in claim 1, wherein the bottom plate includes apertures arranged to permit air inflow.

7. The antenna module defined in claim 1, wherein the antenna-radio unit is a first antenna-radio unit, and further comprising second and third antenna-radio units mounted to the support pole.

8. The antenna module defined in claim 7, wherein the support pole is mounted in a center of the bottom plate.

9. The antenna module defined in claim 1, mounted on a monopole.

10. A monopole assembly, comprising:
    an elongate monopole, and
    an antenna module, comprising:
    an antenna-radio unit comprising an antenna and a first radio transceiver in an integrated unit;
    a foundation plate including discontinuous arcuate slots configured for mounting to the monopole;
    a bottom plate mounted above the foundation plate to form a first air gap;
    a support member that is coupled to and extends upwardly from the bottom plate, the antenna-radio unit mounted to the support member;
    an upper plate mounted to an upper end of the support member;
    a fan unit mounted to the upper plate;
    a lower cap mounted above the upper plate;
    an upper cap mounted above the lower cap to form a second air gap; and
    a shroud that surrounds and conceals the antenna-radio unit and the support member; and
    a second radio transceiver mounted outside of the antenna module and connected to the antenna.

11. The monopole assembly defined in claim 10, wherein the antenna includes a first portion operatively connected with the first radio transceiver, and a second portion connected with the second radio transceiver.

12. The monopole assembly defined in claim 10, further comprising a fan controller operatively connected with the fan to control operation of the fan.

13. The monopole assembly defined in claim 12, wherein the fan controller controls the fan based on temperature.

14. The monopole assembly defined in claim 10, wherein the support pole is mounted off-center on the bottom plate.

15. The monopole assembly defined in claim 10, wherein the bottom plate includes apertures arranged to permit air inflow.

16. The monopole assembly defined in claim 10, wherein the antenna-radio unit is a first antenna-radio unit, and further comprising second and third antenna-radio units mounted to the support pole.

17. The monopole assembly defined in claim 16, wherein the support pole is mounted in a center of the bottom plate.

18. An antenna module, comprising:
    three antenna-radio units each comprising an antenna and a radio transceiver in an integrated unit;
    a foundation plate configured for mounting to a monopole;
    a bottom plate mounted above the foundation plate to form a first air gap;
    a support member that extends upwardly from the bottom plate, the antenna-radio units mounted to the support member;
    an upper plate mounted to an upper end of the support member;
    a fan unit mounted to the upper plate;
    a lower cap mounted above the upper plate;
    an upper cap mounted above the lower cap to form a second air gap; and
    a hexagonal shroud that surrounds and conceals the antenna-radio units and the support member,
    wherein at least one of the antenna-radio units is configured and mounted to be down-tilted through a cut-out portion in the hexagonal shroud.

19. The antenna module defined in claim 18, wherein the shroud comprises cut-out portions sized and configured such that at least a portion of a respective antenna-radio unit extends through the shroud.

20. The antenna module defined in claim 18, wherein at least one of the antenna-radio units is configured to be down-tilted.

\* \* \* \* \*